UNITED STATES PATENT OFFICE 2,653,079

PROCESS FOR THE PREPARATION OF CHLORINE DIOXIDE

Ernst Wagner, Konstanz, Germany, assignor to Deutsche Gold- und Silber-Scheideanstalt vormals Roessler, Frankfurt am Main, Germany, a corporation of Germany No Drawing. Application June 6, 1949, Serial No. 97,477. In France June 10, 1948

3 Claims. (Cl. 23—152)

The present invention relates to an improved process for the preparation of chlorine dioxide and more particularly to an improved process for the preparation of chlorine dioxide from acidified chlorate containing solutions in the presence of a reducing agent.

It is an object of the invention to provide a process for the production of improved yields of chlorine dioxide from chlorates.

It is a further object of the invention to provide a process for the preparation of chlorine dioxide from chlorates while maintaining the production of undesired by-products at a minimum.

It is still another object of the invention to provide a process for the continuous production of chlorine dioxide while regulating the temperature of the reaction.

The preparation of chlorine dioxide from acidified chlorate solutions in the presence of a reducing agent is already known. Such reaction may, for example, be carried out in accordance with the following equation:

$$2NaClO_3 + H_2SO_4 + (COOH)_2 = 2ClO_2 + Na_2SO_4 + CO_2 + 2H_2O \quad (I)$$

Carrying out this reaction in large scale technical processes gives rise to numerous difficulties for various reasons. First of all, chlorine dioxide is very unstable and tends to decompose spontaneously. Consequently, depending upon the temperature, or the excess or concentration of the $H_2SO_4$, more or less of the chlorine dioxide which is produced decomposes to chlorine and oxygen. According to the equation $$NaClO_3 + H_2SO_4 = NaH_2SO_4 + ClO_2 + \tfrac{1}{2}H_2O + \tfrac{1}{4}O_2 \quad (II)$$

the heat of reaction for the production of 1 mol. of $ClO_2$ is $-8$ Kcal. On the other hand, the oxidation of the organic reducing agent to $CO_2$ and $H_2O$ produces 51 Kcal. for every gram atom of oxygen consumed.

The side-reaction which proceeds in accordance with the following equation:

$$NaClO_3 + H_2SO_4 = NaHSO_4 + \tfrac{1}{2}Cl_2 + \tfrac{1}{2}H_2O + 1\tfrac{1}{4}O_2 \quad (III)$$

produces a positive heat of reaction of 15 K cal. per mol of chlorate consumed. Even though the production of chlorine dioxide from sodium chlorate or chloric acid is endoethermic, the reaction as a whole is strongly exothermic. As increasing temperature favors the production of chlorine and also the oxidation of the reducing agent, the heat produced in the reaction increases greatly for the production of the chlorine also delivers 15 Kcal. per mol. The considerable quantities of heat which are freed lead to the danger of decomposition of increasingly greater quantities of chloric acid or chlorine dioxide.

In large scale operations, the reaction produces difficulties because the natural heat losses in large apparatus do not suffice to neutralize the heat produced during the reaction, which heat increases as larger quantities of chlorine become mixed with the gas whether it be through further reduction of the chloric acid or the spontaneous decomposition of the chlorine dioxide.

It has now been found according to the present invention that these difficulties may be overcome without complicating the apparatus employed to any substantial degree by coupling the heat consuming evaporation of water with these exothermic reactions. For a reaction which is as sensitive a reaction as is entailed in the exclusive reduction of chloric acid with a non-selective reducing agent it is imperative that the temperature of the reaction be maintained as constant as possible. The means employed in accordance with the invention is especially well suited for the process in question as the heat is taken up directly at the points where it is formed whereby local increases or differences in temperature of any consequence are avoided.

When 60% of the chlorate is converted according to Equation II and 20% according to Equation III, the reaction as a whole produces about 43 K cal. of heat per grammol of chlorate consumed. However, this quantity of heat will evaporate about 80 grams of $H_2O$ at 85° C.

The following table indicates the amount of inert gas required to evaporate 80 grams of water at various temperatures. The vapor pressures correspond to that of saturated water vapor over 20% $H_2SO_4$:

| Temperature | 80° C. | 85° C. | 90° C. |
|---|---|---|---|
| Vapor pressure mm. Hg | 314.264 | 384.170 | 465.859 |
| Liters of inert gas required | 141 | 98 | 63 |

The quantities of inert gas signified, of course, require that they are retained long enough to be saturated with water vapor. As in practice this may not always be the case, the quantity of inert gas, such as, air, blown through the apparatus is preferably increased until the heat losses caused by the evaporation of water are substantially equal to the heat produced by the reaction or such losses are sufficient to render the entire process slightly endothermic. The latter is simpler for a technical process and is preferred for the sake of safety.

The use of an inert gas in the production of ClO₂ is already known. However, in the known processes the quantity of inert gas employed is only that required to dilute the ClO₂ in order to prevent its decomposition which is likely to occur at the temperature of the reaction. According to the present invention, however, the quantity of inert gas introduced in the reaction medium is substantially greater and is sufficient that the evaporation of the water effects a consumption of heat which is at least equal to the heat liberated during the reaction. Local rises in temperature are thereby avoided.

The procedure, in accordance with the invention, has the great advantage in that to regulate the temperature of the reaction it is not necessary to withdraw heat continuously but it is merely necessary to supply heat whenever necessary. The latter is more easily accomplished than the former. Furthermore, local increases in temperature which lead to the decomposition of large quantities of the desired ClO₂, which, in some instances, is of explosive character, are avoided with certainty.

The procedure in accordance with the invention has still another advantage which is of great value. In view of the evaporation of water, the reaction mixture is concentrated during the reaction. In view of this concentration the reaction is not only accelerated but the reaction between the acid, chlorate, and reducing agent becomes more complete. For example, in accordance with the invention, 80% and more of the chlorate may be consumed in one passage through a reaction column.

The vigorous reactions which are normally to be feared in concentrating reaction mixtures of this type need not be feared in the process according to the invention, for the concentration which is effected by evaporation of the water with the aid of large quantities of air, simultaneously effects cooling of the reaction mixture and consequently moderates the reaction. Furthermore, a certain uniformity in the course of the reaction is achieved through the constant concentration by the evaporation of water from the reaction mixture as the quantity of reactants in the reaction mixture is reduced by consumption during the progress of the reaction. In this way, the partial pressure of the ClO₂ may be kept uniformly low which is important for the rapid absorption of the ClO₂ from the reaction products to prevent further undesired reduction thereof.

In accordance with the invention it is furthermore possible to add the chlorate solution to the reaction column in such a dilute state that no noticeable reaction takes place at room temperature. This renders it possible to obtain more reliable control of the reactants in the chlorate solution introduced into the reaction column and to prevent losses of ClO₂ through premature reaction. It is also possible according to the invention to adapt the temperature employed for the reaction to the chlorate concentration of the solution. It is, for example, possible to heat the column in different steps, that is, the temperature may increase as the chlorate is consumed so that the normal reduction in speed of reaction caused by the decrease in the chloric acid concentration may be compensated for by increasing the temperature.

Substantially all chlorates may be employed in the process in accordance with the invention although some may be more suitable than others. For example, potassium chlorate in view of low solubility may only be employed in very dilute or very hot solutions. Also in the treatment of chlorates, such as, calcium and barium chlorates, which form insoluble sulfates in sulfuric acid solution it is preferable to provide the treating column with surface increasing elements of such construction that no clogging occurs.

Practically all acids may be employed for liberating the chloric acid from the chlorates as long as they are stronger acids than chloric acid. However, strong oxidizing acids such as HNO₃ should be avoided. The use of HCl is sometimes preferable especially when a high chlorine content in the ClO₂ is not undesirable or is even preferred as for bleaching cellulose.

The following example will serve to illustrate the process according to the invention.

*Example*

A solution which contains 100 grams of oxalic acid, 200 grams of sodium chlorate and 250 grams of sulfuric acid per 1000 grams of water is preheated to 75° C. and introduced at a rate of 200 ccm. per hour into the top of a column while about 215 liters of an inert gas such as air are blown through the column per hour. The column is heated with a heating jacket to 80° C. to 85° C. A vessel is connected to the bottom of the column which is heated to the column temperature or slightly higher. The liquid flowing from the bottom of the column may remain in such vessel for a short period of time, for example, 10 minutes, to complete the reaction.

It is also possible to introduce only a part of this inert gas stream into the bottom of the column or even into the reaction vessel connected to the bottom of the column and introducing the remainder of the inert gas stream in the upper third or quarter of the column.

The process in accordance with the invention may be combined with the procedures disclosed in my copending applications entitled Process for the Preparation of Chlorine Dioxide, Serial Numbers 97,478, and 97,479 (now Patent No. 2,605,168, July 29, 1952), filed June 6, 1949, and my copending application entitled Process for the Preparation of Solid Chlorite, Serial Number 97,476, filed June 6, 1949 (now Patent No. 2,616,783, November 14, 1952).

I claim:

1. In a process for the production of chlorine dioxide from an acidified aqueous chlorate reaction solution containing sulfuric acid, a chlorate and a reducing agent, the step which comprises passing through said reaction solution a sufficient quantity of an inert gas which is initially unsaturated with water vapor to evaporate and entrain a quantity of water sufficient that the heat consumed by such evaporation is at least equal to all of the heat produced by the reactions occurring in the process and maintaining a reaction temperature between 75° C. and 90° C.

2. A process in accordance with claim 1 in which said inert gas is air.

3. In a process for the production of chlorine dioxide from an acidified aqueous chlorate reaction solution containing sulfuric acid, a chlorate and a reducing agent, the steps which comprise passing through said reaction solution a sufficient quantity of an inert gas which is initially unsaturated with water vapor to evaporate and entrain a quantity of water sufficient that the heat consumed by such evaporation is greater than all of the heat produced by the reactions occurring in the process and supplying heat from an external source to maintain a reaction temperature between 80° C. and 90° C.

ERNST WAGNER.

References Cited in the file of this patent

UNITED STATES PATENTS

| Number | Name | Date |
| --- | --- | --- |
| 1,971,563 | Hirschkind et al. | Aug. 28, 1934 |
| 2,332,181 | Soule | Oct. 19, 1943 |
| 2,335,808 | Soule | Nov. 30, 1943 |
| 2,344,418 | Schonberg | Mar. 14, 1944 |
| 2,409,862 | Hutchinson | Oct. 22, 1946 |
| 2,510,034 | Haller | May 30, 1950 |

FOREIGN PATENTS

| Number | Country | Date |
| --- | --- | --- |
| 383,434 | Great Britain | Nov. 27, 1931 |
| 575,173 | Great Britain | Feb. 6, 1946 |